United States Patent [19]
Krantz

[11] Patent Number: 5,709,084
[45] Date of Patent: Jan. 20, 1998

[54] MOTOR VEHICLE HYDROSTATIC TRANSMISSION HAVING AN INTERNAL OIL EXPANSION CHAMBER

[75] Inventor: Douglas William Krantz, Fort Wayne, Ind.

[73] Assignee: Dana Corporation, Toledo, Ohio

[21] Appl. No.: 661,299

[22] Filed: Jun. 13, 1996

[51] Int. Cl.$^6$ ..................................................... F16D 31/02
[52] U.S. Cl. ........................... 60/453; 60/464; 60/487
[58] Field of Search ............................ 60/329, 453, 464, 60/487

[56] References Cited

U.S. PATENT DOCUMENTS

| | | | |
|---|---|---|---|
| 4,903,545 | 2/1990 | Louis et al. | 74/606 R |
| 4,987,796 | 1/1991 | von Kaler et al. | 74/606 |
| 5,234,321 | 8/1993 | Gafrert | 417/219 |
| 5,259,194 | 11/1993 | Okada | 60/456 |
| 5,289,738 | 3/1994 | Szulczewski | 74/606 R |
| 5,394,699 | 3/1995 | Matsufuji | 60/442 |
| 5,440,951 | 8/1995 | Okada et al. | 74/606 R |
| 5,505,279 | 4/1996 | Louis et al. | 180/305 |
| 5,593,000 | 1/1997 | Johnson | 180/305 |

FOREIGN PATENT DOCUMENTS 438517  12/1935  United Kingdom ..................... 60/487

Primary Examiner—F. Daniel Lopez
Attorney, Agent, or Firm—Oldham & Oldham Co., L.P.A.

[57] ABSTRACT

Motor vehicle hydrostatic transmission having an internal oil expansion chamber including a main housing having at least one opening, this main housing including a sump pump oil reservoir having a predetermined volume of sump pump oil and an input cover sealingly attached to an opening in the main housing, this input cover having an internal oil expansion reservoir which captures or traps a specified volume of air above the sump pump oil level. Thus, when the oil level rises due to elevated operating temperatures, this captured or trapped air volume is decreased resulting in an increase in both the captured or trapped air pressure and the sump pump oil pressure. This causes an increase in the hydrostatic transmission's operating efficiency since the sump pump oil pressure acts as a charge pump to supercharge the low pressure inlet of the closed loop hydraulic system. In addition, the hydrostatic transmission bearing performance will increase since they are designed to operate under pressure.

10 Claims, 1 Drawing Sheet

MOTOR VEHICLE HYDROSTATIC TRANSMISSION HAVING AN INTERNAL OIL EXPANSION CHAMBER

BACKGROUND AND SUMMARY OF THE INVENTION

The present invention relates generally to new and novel improvements in hydrostatic transmissions for motor vehicles. More particularly, the present invention relates to hydrostatic transmissions for motor vehicles having internal oil expansion chambers which act to increase the hydrostatic transmissions' operating efficiency and performance.

Hydrostatic transmissions of the type to which the present invention relates have been commonly used commercially in relatively small lawn and garden tractors. Many of these prior art hydrostatic transmissions utilize external oil reservoirs which allow for oil expansion due to elevated operating conditions. However, such external oil reservoirs add to the weight and complexity of such prior art hydrostatic transmissions and may leak and/or clog over time, thus resulting in performance problems and possible damage to hydrostatic transmission components.

Other prior art hydrostatic transmissions use flexible diaphragms which compress with increasing oil levels. Such flexible diaphragms are typically vented on one side to the atmosphere to equalize the sump oil pressure, while the other side of the diaphragm is in contact with the hydraulic oil to provide a seal and protect the hydraulic oil from outside elements. However, problems which have been experienced with such flexible diaphragms include leakage and wear over time and the loss of flexibility in the material from which the flexible diaphragms are fabricated.

A preferred embodiment of the present invention is, therefore, directed to a hydrostatic transmission having an internal oil expansion chamber including a main housing having at least one opening, this main housing including a sump pump oil reservoir having a predetermined volume of sump pump oil, and an input cover sealingly attached to an opening in the main housing, this input cover having an internal oil expansion reservoir which captures or traps a specified volume of air above the sump pump oil level. Thus, when the sump pump oil level rises due to elevated operating temperatures, this captured or trapped air volume is decreased resulting in an increase in both the air pressure and the sump pump oil pressure. This causes an increase in the hydrostatic transmission's operating efficiency since the sump pump oil pressure acts as a charge pump to supercharge the low pressure inlet of the closed loop hydraulic system. In addition, the hydrostatic transmission bearing performance will increase since they are designed to operate under pressure.

Other advantages and novel features of the present invention will become apparent in the following detailed description of the invention when considered in conjunction with the accompanying drawing.

DETAILED DESCRIPTION OF THE DRAWING

Figure 1:
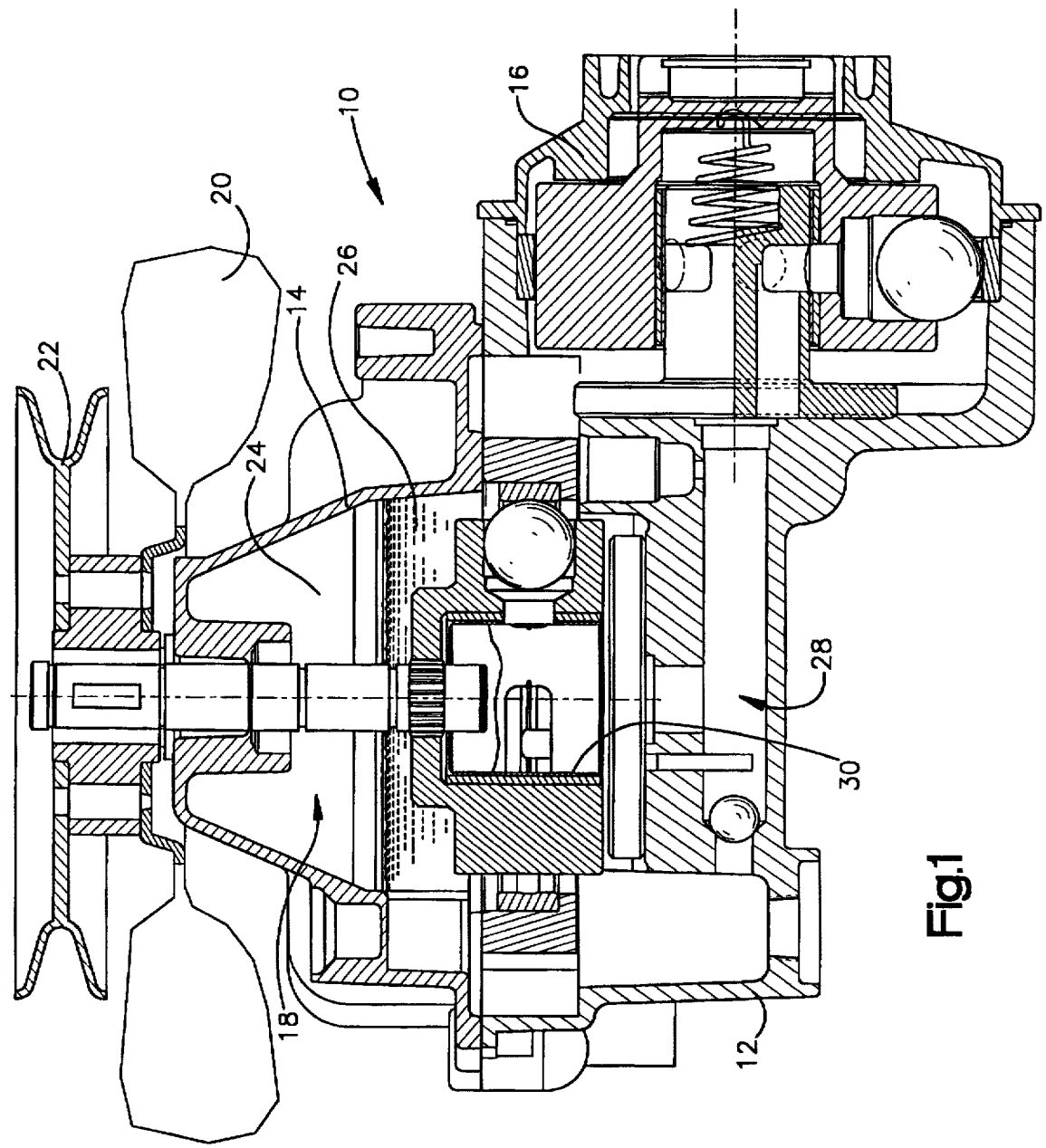
FIG. 1 illustrates a cross-sectional side view of a motor vehicle hydrostatic transmission having an internal oil expansion chamber in accordance with a preferred embodiment of the present invention.

In the following detailed description of a preferred embodiment of the present invention, reference is made to the accompanying drawing which, in conjunction with this detailed description, illustrates and describes a preferred embodiment of a motor vehicle hydrostatic transmission having an internal oil expansion chamber in accordance with the present invention. Referring now to FIG. 1, which illustrates a cross-sectional side view of a motor vehicle hydrostatic transmission, generally identified by reference numeral 10, having an internal oil expansion chamber in accordance with a preferred embodiment of the present invention, motor vehicle hydrostatic transmission 10 is generally enclosed in main housing 12, input cover 14, and output cover 16. Internal oil expansion chamber, generally identified by reference numeral 18, is built into input cover 14 and is positioned below fan 20 and pulley 22 assembly. Internal oil expansion chamber 18 is constructed to capture or trap a specified volume of air 24 above sump pump oil 26. Thus, when the level of sump pump oil 26 rises due to elevated operating temperatures, the captured or trapped specified volume of air 24 is decreased resulting in an increase in the captured or trapped specified volume of air 24 pressure and sump pump oil 26 pressure to a value preferably no higher than 15 pounds per square inch. This causes an increase in the operating efficiency of motor vehicle hydrostatic transmission 10 since the increased sump pump oil 26 pressure acts as a charge pump to supercharge the low pressure inlet 28 of the closed loop hydraulic system (not shown). In addition, motor vehicle hydrostatic transmission bearing 30 performance will increase since they are designed to operate under pressure. Furthermore, by properly confining captured or trapped specified volume of air 24, or captured or trapped specified volume of air 24 will not be agitated by the moving components which otherwise can create undesirable air bubbles within sump pump oil 26 resulting in increased noise levels and reduced performance.

Input cover 14 is constructed to provide a flooded oil sump for motor vehicle hydrostatic transmission 10. The configuration of the oil sump of cover 14 is preferably a straight cylinder, whereas the internal air expansion chamber of the input cover 14 is conical, so captured or trapped captured specified volume of air 24 will be confined from rotating components up to at least a 25° incline.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle hydrostatic transmission, comprising:
   a main housing having at least one opening; and
   an input cover sealingly attached to said at least one opening of said main housing, said input cover including a sump pump oil reservoir having a predetermined volume of sump pump oil and an internal oil expansion reservoir which captures a specified volume of air above said predetermined volume of sump pump oil.

2. The motor vehicle hydrostatic transmission in accordance with claim 1, further including a fan and pulley assembly mounted on said input cover and said internal oil expansion reservoir is positioned below said fan and pulley assembly.

3. The motor vehicle hydrostatic transmission in accordance with claim 2, wherein said internal oil expansion reservoir has a conical configuration.

4. The motor vehicle hydrostatic transmission in accordance with claim 1, wherein said sump pump oil reservoir has a cylindrical configuration.

5. The motor vehicle hydrostatic transmission in accordance with claim 4, wherein said internal oil expansion reservoir has a conical configuration.

6. The motor vehicle hydrostatic transmission in accordance with claim 1, wherein said sump pump oil reservoir has a cylindrical configuration to preclude entry of said specified volume of air into rotating components of said motor vehicle hydrostatic transmission up to an incline of 25°.

7. The motor vehicle hydrostatic transmission in accordance with claim 6, wherein said internal oil expansion reservoir has a conical configuration.

8. The motor vehicle hydrostatic transmission in accordance with claim 1, wherein said predetermined volume of sump pump oil and said specified volume of air above said predetermined volume of sump pump oil are selected to provide an internal elevated operating pressure of no more than 15 pounds per square inch under normal operating conditions.

9. The motor vehicle hydrostatic transmission in accordance with claim 8, wherein said internal oil expansion reservoir has a conical configuration.

10. The motor vehicle hydrostatic transmission in accordance with claim 1, wherein said internal oil expansion reservoir has a conical configuration.

* * * * *